US008901921B2

(12) United States Patent
Sterling (10) Patent No.: US 8,901,921 B2
(45) Date of Patent: Dec. 2, 2014

(54) ANGLE MEASUREMENT SYSTEM FOR DETERMINING AN ANGULAR POSITION OF A ROTATING SHAFT

(75) Inventor: James William Sterling, Novi, MI (US)

(73) Assignee: Infineon Technologies AG, Neubiberg (DE)

( * ) Notice: Subject to any disclaimer, the term of this patent is extended or adjusted under 35 U.S.C. 154(b) by 548 days.

(21) Appl. No.: 12/626,481

(22) Filed: Nov. 25, 2009

(65) Prior Publication Data

US 2011/0121824 A1    May 26, 2011

(51) Int. Cl.
*G01B 7/30* (2006.01)
*G01D 5/14* (2006.01)

(52) U.S. Cl.
CPC . *G01D 5/145* (2013.01); *G01B 7/30* (2013.01)
USPC .................................. 324/207.25; 324/207.21

(58) Field of Classification Search
USPC ............................. 324/207.25, 207.2, 207.21
See application file for complete search history.

(56) References Cited

U.S. PATENT DOCUMENTS

| | | | |
|---|---|---|---|
| 7,312,609 B2 * | 12/2007 | Schmollngruber et al. | 324/252 |
| 7,378,841 B2 * | 5/2008 | Kurita et al. | 324/207.25 |
| 7,583,080 B2 * | 9/2009 | Uehira et al. | 324/207.25 |
| 7,800,357 B2 * | 9/2010 | Ruetz | 324/207.25 |
| 8,058,866 B2 * | 11/2011 | Granig et al. | 324/207.21 |
| 2007/0090829 A1 | 4/2007 | Kurita et al. | |
| 2010/0060272 A1 * | 3/2010 | Tanaka et al. | 324/207.25 |
| 2010/0194385 A1 * | 8/2010 | Ronnat et al. | 324/207.25 |
| 2011/0175600 A1 | 7/2011 | Jerance et al. | |

FOREIGN PATENT DOCUMENTS

| | | | | |
|---|---|---|---|---|
| DE | 102004004025 A1 * | 10/2004 | | B62D 15/02 |
| WO | WO 2007145296 A1 * | 12/2007 | | |
| WO | WO 2009068695 A1 * | 6/2009 | | G01D 5/245 |

OTHER PUBLICATIONS

Machine English Translation of the description of DE 102004004025 A1, obtained from EPO website (http://worldwide.espacenet.com/), 4 pages, obtained on Aug. 14, 2012.*

* cited by examiner

*Primary Examiner* — Jay Patidar
*Assistant Examiner* — David M. Schindler
(74) *Attorney, Agent, or Firm* — Eschweiler & Associates, LLC (57) ABSTRACT

Some aspects of the present disclosure relate to techniques for measuring an angular position of a rotating shaft. As will be described in greater detail below, some angle measurement systems of the present disclosure include at least two magnets that cooperatively rotate at different rates according to a predetermined relationship (e.g., a predetermined gear ratio). Two or more magnetic field sensing elements, which are often stationary, measure the directionality of the resultant magnetic field at different positions for a particular angular shaft position. Based on the directionality measured by the magnetic field sensing elements, the techniques can determine an absolute angular position of the rotating shaft, which can be greater than three-hundred and sixty degrees.

9 Claims, 8 Drawing Sheets

ANGLE MEASUREMENT SYSTEM FOR DETERMINING AN ANGULAR POSITION OF A ROTATING SHAFT

BACKGROUND

Magnetic sensing devices, such as Giant Magnetoresistive (GMR) sensors, for example, are used in a wide variety of applications. For example, GMR sensors are often used for sensing the angular position of a rotating shaft. In such applications, a permanent magnet, sometimes referred to as a "pill", can be mounted to an end of a steering shaft and centered on the shaft's axis of rotation. The GMR elements or resistors, which are typically connected to form one or more bridges, are also positioned so as to be centered on the axis of rotation, with the resulting output signals generated by the GMR resistors being indicative of the angular position of the rotating shaft. However, as the inventors have appreciated, in many applications it is inefficient to mount the GMR sensors on at the end of the shaft on its axis of rotation, due to space limitations. For example, in vehicles, the end of a steering shaft typically has a to a knuckle assembly attached thereto, and there is no practical way of mounting a GMR sensor on the steering shaft's axis of rotation because the knuckle assembly impedes such a configuration.

Therefore, improved angle sensing techniques are needed.

DETAILED DESCRIPTION

The claimed subject matter is now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Aspects of the present disclosure relate to techniques for measuring an angular position of a rotating shaft. As will be described in greater detail below, some angle measurement systems of the present disclosure include at least two magnets that cooperatively rotate at different rates according to a predetermined relationship (e.g., a predetermined gear ratio). One or more angle sensors, which are often stationary, measure the directionality of the resultant magnetic field at different positions for a particular angular shaft position. Based on the magnetic field directionality measured by the angle sensors, the techniques can determine an absolute angular position of the rotating shaft.

As may be appreciated from the details below, angle measurement techniques in accordance with the present disclosure may be beneficial in any number of applications that make use of a rotating shaft. In some applications, these techniques can be used to measure both relative angles and an absolute angle. In essence, a relative angle is an angular position measured within a single 360° rotation, while an absolute angle is an angular position that can account for more than one 360° rotation. For example, a relative angular position could measure a 45° rotation relative to true vertical (with no indication of how many 360° rotations passed from a previous measurement), while an absolute angular position could indicate two complete 360° rotations plus a 45° rotation relative to some fixed line of reference (e.g., 765° rotation relative to the fixed line of reference).

Figure 1:
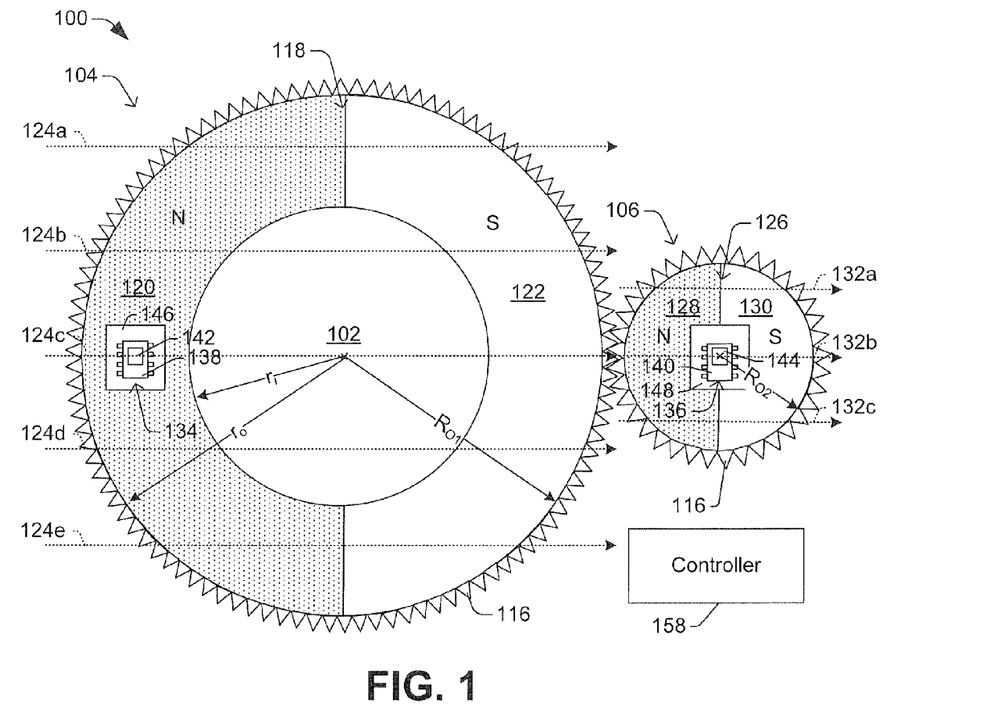
FIG. 1 is a top view of an angle measurement system according to one embodiment.
Figure 2:
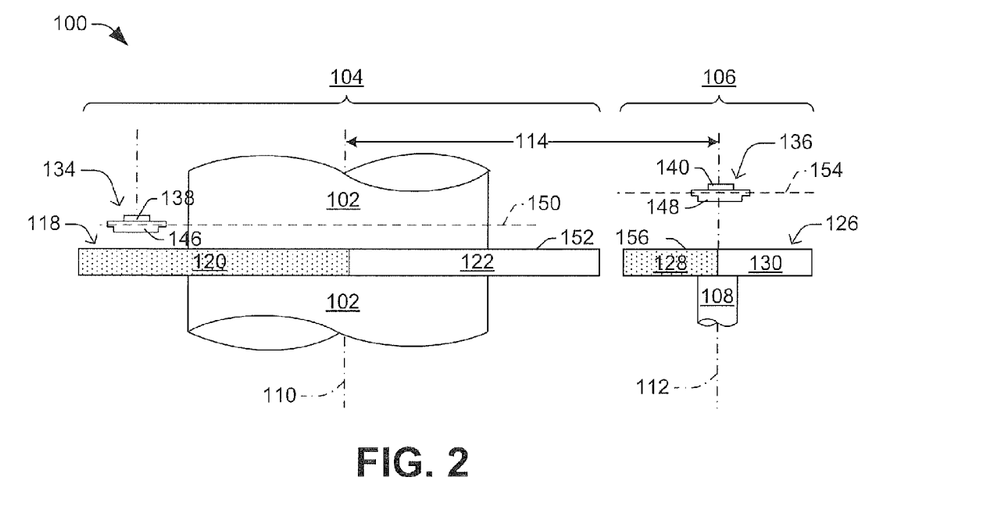
FIG. 2 is a side view of the angle measurement system of FIG. 1.

FIGS. 1 and 2 illustrate a top view and side view, respectively, of an angle measurement system 100 for determining an absolute angle of a rotating shaft 102, such as a steering shaft in a vehicle. The angle measurement system includes first and second bodies (104, 106) that are coupled to rotating shafts (102, 108, respectively), where the shafts' rotational axes (110,112, respectively) are spaced apart by a distance 114. Note that although the axes 110, 112 are parallel in the illustrated embodiment, in other embodiments that could be tilted with respect to one another, such as in a worm gear configuration, for example.

The first and second bodies (104, 106) have outer radii ($R_{O1}$ $R_{O2}$, respectively) that define outer circumferences of the bodies along which teeth 116 are disposed. The number of teeth 116 along the outer circumferences can be arranged according to a predetermined gear ratio, thereby facilitating rotational motion of the first and second bodies (104, 106) about their rotational axes (110, 112, respectively) according to a predetermined relationship.

Each body includes one or more magnets adapted to provide a magnetic field that rotates according to the movement of the body. For example, the first body 104 includes a first magnet 118, which can be a permanent ring magnet having a north pole 120 and a south pole 122, mounted to the rotating shaft 102. Magnetic field lines of a first magnetic field due to the first magnet 118 extend from north pole 120 to south pole 122, as indicated by magnetic field lines 124a-124e. Similarly, the second body 106 includes a second magnet 126, which can be a permanent circular or "button" magnet having a north pole 128 and a south pole 130. Magnetic field lines of a second magnetic field due to the second magnet 126 extend from north pole 128 to south pole 130, as indicated by magnetic field lines 132a-132c. For purposes of simplicity, only straight magnetic field lines are shown in the illustrations herein, although it will be appreciated that the magnetic field lines often curve or bend in actual implementations.

Two or more angle sensors (e.g., first angle sensor 134 and second angle sensor 136), are positioned in different locations with respect to the first and second magnets 118, 126, respectively. In some embodiments, first and second angle sensors 134, 136 comprise first and second semiconductor chips (138, 140, respectively) having GMR resistor regions (142, 144, respectively) and mounted on printed circuit boards (146, 148, respectively).

FIGS. 1 and 2 show the first angle sensor 134 positioned over the first magnet 118. More particularly, the first angle sensor 134 is often positioned in a plane 150 parallel to a surface 152 of ring magnet 118 such that resistor region 142 is substantially centered along a radius extending through the rotational axis 110 of rotating shaft 102 and between an inner radius ($r_i$) and an outer radius ($r_O$) of ring magnet 118. Moreover, the resistor region 142 is often equidistant between the inner and outer radii $r_i$, $r_o$ to help limit undesirable field variations encountered near the edges of the ring magnet 118.

FIGS. 1 and 2 also show the second angle sensor 136 positioned over the second magnet 126. More particularly, the second angle sensor 136 is often positioned in a plane 154 parallel to a surface 156 of the button magnet 126 such that the resistor region 144 is substantially centered on the rotational axis 112 of the button magnet. The distances between the planes 150, 154 and surfaces 152, 156 could be the same or different, depending on the implementation.

Typically, the first and second angle sensors 134, 136 remain stationary while the first and second magnets 118, 126 rotate there under. In this way, the first and second angle sensors 134, 136 measure the directionality or relative angle of the magnetic field at their respective positions, and provide the relative angle information to a controller 158 (e.g., microcontroller). The controller 158 can then determine the absolute angle of the rotating shaft 102 based on the relative angles from the first and second angle second 134, 136. Because each degree along the absolute angle of the shaft corresponds to a different pair of measurements for the first and second angle sensor, the gear ratio flexibility offers endless possibilities for absolute angle of the shaft.

To facilitate suitable functionality, the number of full rotations, $T_i$, for the ring magnet 118 (and shaft 102) can be expressed by equation (1) below:

$$T_i = \frac{A}{a} \tag{1}$$

where A is the absolute angle through which the shaft 102 turns, and a=360° (assuming the maximum possible shaft rotation for all turns).

A designer can then select an integer, i, and calculate the size ratio, z, of the ring magnet 118 to the button magnet 126 according to equation (2) below:

$$z = i \pm \frac{1}{T_i} \tag{2}$$

The number full rotations for the button magnet 126 can then be determined by using equation (3) below:

$$t_i = \frac{A}{\frac{a}{z}} \tag{3}$$

The smaller the number of full rotations, the less accuracy required for the angle sensor 134 measuring the angle of the ring magnet 118. The number of degrees separating any given relative angle for ring magnet with a repeating relative angle for button magnet is expressed by equation (4) below:

$$\lambda^o = \frac{a}{t_i} \tag{4}$$

Therefore, the relative angle measurement for the ring magnet must be $$\pm \frac{\lambda^o}{2}$$

to achieve the system accuracy defined by the relative angle measurement error for the button magnet. For clarity, a more detailed example where A=1440°, and i=2 is illustrated and discussed further herein. See e.g., FIGS. 5-6 and related text.

Figure 3:
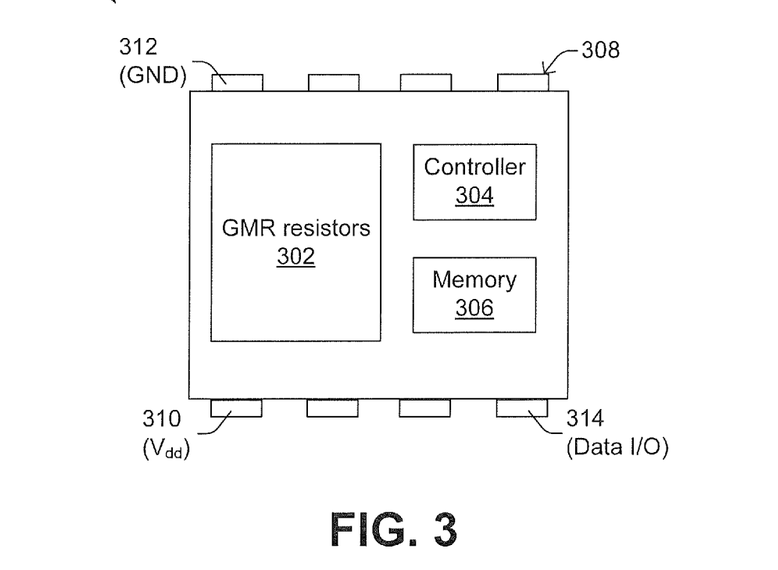
FIG. 3 a block diagram generally illustrating one embodiment of a GMR angle sensor suitable for use with the angle measurement system of FIG. 1.

FIG. 3 is a block diagram generally illustrating one embodiment of a GMR angle sensor 300 (e.g., angle sensor 134 and/or 136 from FIG. 1). As illustrated, in addition to GMR resistor region 302, GMR angle sensor 300 may further include a controller 304 and a memory 306, with memory 306 storing values for a plurality of GMR parameters (e.g., calibration parameters). GMR angle sensor 300 further includes a plurality of pins 308, such as a supply voltage ($V_{DD}$) pin 310, a ground pin 312, and a data I/O pin 314.

Figure 4:
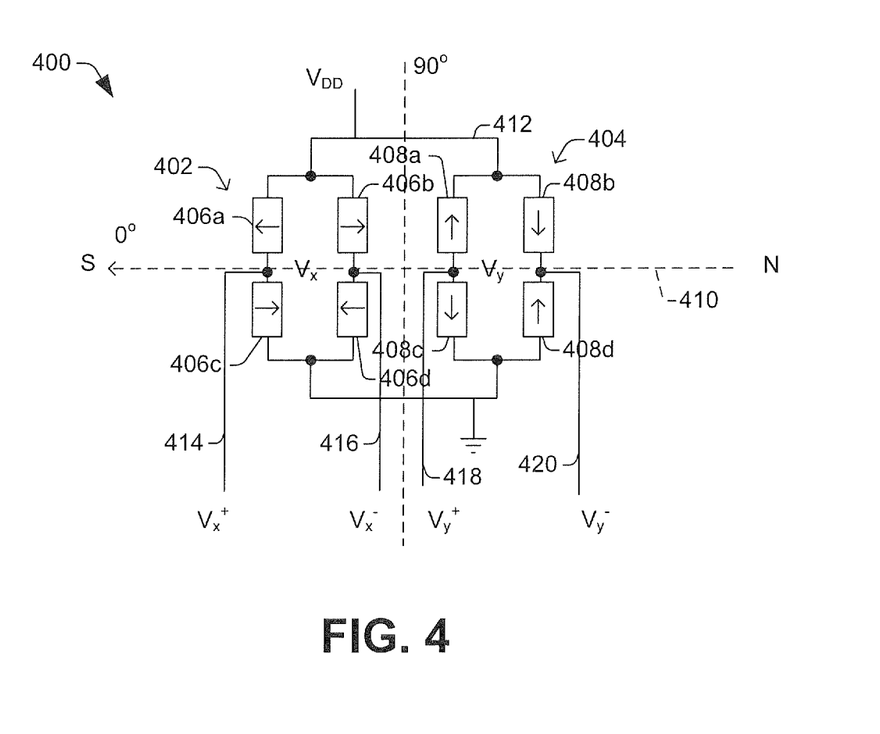
FIG. 4 is a schematic diagram illustrating a GMR resistor configuration according to one embodiment.

FIG. 4 is a schematic diagram generally illustrating GMR resistor region 400 (e.g., GMR resistor region 302 in FIG. 3) according to one embodiment. As illustrated, GMR resistor region 400 includes a pair of GMR sensor bridges 402 and 404, with sensor bridge 402 formed by four GMR resistors 406a-406d and sensor bridge 404 formed by four GMR resistors 408a-408d. According to the bridge implementation of FIG. 4, GMR sensor bridges 402 and 404 are disposed orthogonal to one another and are respectively configured to sense an x-component and a y-component of a rotating magnetic field, such as the magnetic field indicated by the dashed lines at 410.

A supply voltage $V_{DD}$ is applied to a terminal 412 via pin 310 and voltage signals $V_X+$ and $V_X-$ of GMR sensor bridge 402 are measured at terminals 414 and 416, and voltage signals $V_Y+$ and $V_Y-$ of GMR sensor bridge 404 are measured at terminals 418 and 420. In response to an external magnetic field, such as magnetic field 410, one or more of the GMR resistors 406a-406d and 408a-408d change in their electrical resistances, causing changes in voltage signals $V_X+$ and $V_X-$ at terminals 414 and 416 and voltage signals $V_Y+$ and $V_Y-$ at terminals 418 and 420 which are representative of an angular position of magnetic field 410 relative to a reference vector (e.g. 0-degrees).

Turning now to FIGS. 5A-5D and FIG. 6, one can see a more detailed example of how an absolute angular position of a rotating shaft 102 can be determined by using two angle sensors 134, 136.

Briefly, these figures show that as the rotating shaft 102 is turned, the teeth along the outer circumferences of the first body 104 and second body 106 mesh, causing the first and second bodies 104, 106 to move over different angular distances relative to one another. In moving from between the rotational endpoints, the first body 106 rotates through four full rotations, or an absolute angle of 1440°. The second body correspondingly rotates through nine full rotations, or an absolute angle of 3240°. However, because the first and second angle sensors 134, 136 measure only relative angles, which are less than 360°, a controller (e.g., controller 158 in FIG. 1) is needed to correlate these two relative angles to determine the absolute angle of the shaft 102, which can be between 0° and 1440°.

As will be appreciated in more detail below, as the shaft 102 is rotated through multiple turns, the first and second angle sensors 134, 136 measure the relative angles, which are less than 360°, as shown in Table 1. Even though a single angle sensor may output the same relative angle for different absolute angles of the shaft, the combination of relative angles measured by the first and second angle sensors 134, 136 are different for each absolute angle of shaft 102. Therefore, the controller can determine the absolute angle of the shaft at a given time based on the combination of relative angles measured by the first and second angle sensors at that given time. To facilitate this functionality, the controller often includes a table of expected pairs of relative angles, along with a uniquely corresponding absolute angle, which allows the controller to determine the absolute angle of the shaft from the two angle sensor measurements.

TABLE 1

| Number of rotations of second (small) body 106 | Relative angle measured by second angle sensor 136 | Number of rotations of first (large) body 104 | Relative angle measured by first angle sensor 134 | Absolute angle of shaft 102 |
|---|---|---|---|---|
| 0 | 0° | 0 | 0° | 0° |
| 0 | 121.5° | 0 | 54° | 54° |
| 0 | 243° | 0 | 108° | 108° |
| 1 | 4.5° | 0 | 162° | 162° |
| 1 | 126° | 0 | 216° | 216° |
| 1 | 247.5° | 0 | 270° | 270° |
| 2 | 9° | 0 | 324° | 324° |
| 2 | 130.5° | 1 | 18° | 378° |
| 2 | 252° | 1 | 72° | 432° |
| 3 | 13.5° | 1 | 126° | 486° |
| 3 | 135° | 1 | 180° | 540° |
| 3 | 256.5° | 1 | 234° | 594° |
| 4 | 18° | 1 | 288° | 648° |
| 4 | 139.5° | 1 | 342° | 702° |
| 4 | 261° | 2 | 36° | 756° |
| ... | ... | ... | ... | ... |

As mentioned above, the embodiment of FIGS. 5A-5D and FIG. 6 corresponds to A=1440° and i=2, in equations (1)-(4) above. This means that the shaft 102 rotates through an absolute angle of 1440°, and the size ratio of the ring and button magnets can be 2.25. For purposes of illustration, the example of FIGS. 5A-5D and FIG. 6 are discussed below as having a 0-degree relative angle for first and second bodies 104, 106 defined as being along x-axis 502, a 90-degree relative angle defined as being along y-axis 504, and so on. It will, however, be appreciated that these relative angle positions are somewhat arbitrary, and other relative angular positions could also be assigned in other embodiments.

Figure 5A:
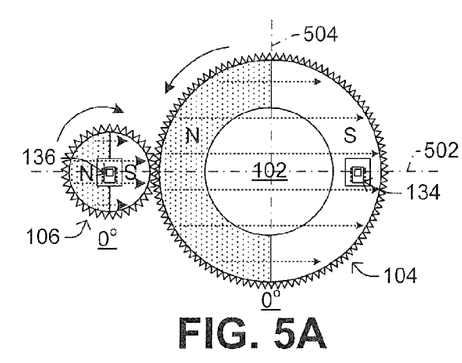
FIGS. 5A-5D illustrate an angle measurement system at various angular positions in time.

FIG. 5A corresponds to one endpoint of the shaft 102, where the first angle sensor 134 measures a relative angle of approximately 0° due to the fact the magnetic field at the first angle sensor 134 lies along x-axis 502. The second angle sensor 136 also measures a relative angle of approximately 0°. See also FIG. 6 (at point labeled "FIG. 5A"). By looking up the unique relative angle pair 0°, 0° for the first and second angle sensors, the controller discerns that the shaft is at an absolute angle of 0° at this point.

Figure 5B:
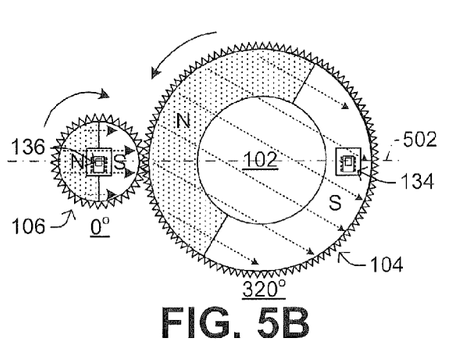
Figure 6:
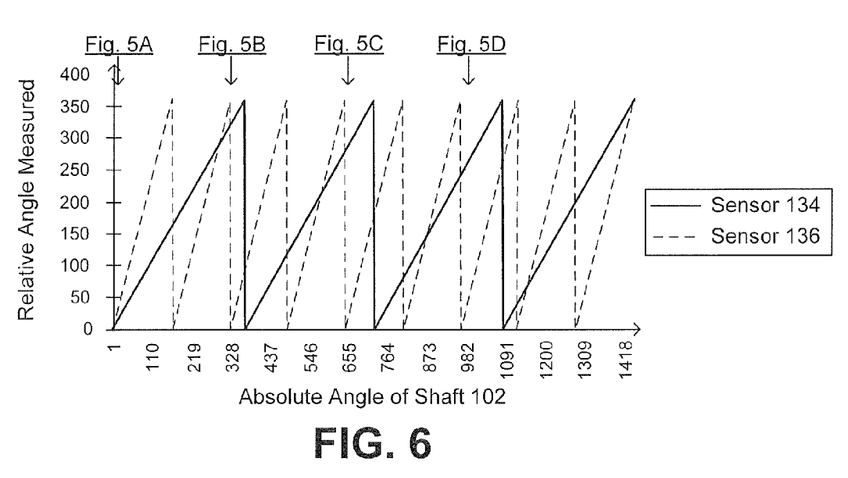
FIG. 6 shows a sample angle calculation plot illustrating signals from the two angle sensors used to derive an absolute angular position and which corresponds to FIGS. 5A-5D.

In FIG. 5B, the first angle sensor 134 now measures a relative angle of approximately 320°, and the second angle sensor measures a relative angle of approximately 0°. As can be seen in FIG. 6, in going from FIG. 5A to FIG. 5B the second angle sensor 136 has measured two full rotations of 360° for the second (smaller) body 106. However, the first angle sensor 134 has measured less than a full rotation (i.e., only 320°) for the first body 104. Again, by looking up the unique relative angle pair 0°, 320° for the first and second angle sensors, the controller discerns that the shaft is at an absolute angle of 320° at this point.

Figure 5C:
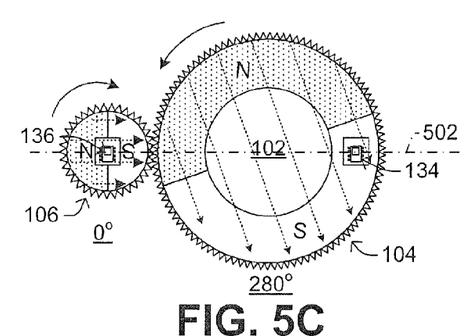

In FIG. 5C, the first angle sensor 134 measures a relative angle of 280° and the second angle sensor 136 measures a relative angle of 0°. Thus, as can be seen from FIG. 6, in going from FIG. 5B to FIG. 5C the second body 106 has again undergone two full rotations of 360°, which now corresponds to an absolute angle of 1440° for the second body 106. The first body 104 (and thus the rotating shaft 102) is still rotating more slowly than the second body 106 and has now rotated through an absolute angle of 640°. Again, by looking up the unique relative angle pair 0°, 280° for the first and second angle sensors, the controller discerns that the shaft is at an absolute angle of 640° at this point.

Figure 5D:
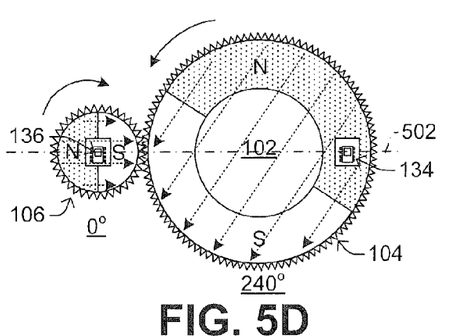

In FIG. 5D, which corresponds to a second endpoint for the shaft 102, the first angle sensor now measures 240° and the second angle sensor measures 0°. As can be seen from FIG. 6, in going from FIG. 5C to 5D, the second body 106 has again undergone two full rotations of 360°, which now corresponds to an absolute angle of 2160° for the second body. The first body 104 (and thus the shaft 102), which is still rotating more slowly than the second body 106, has now rotated through an absolute angle of 960°. Again, by looking up the unique relative angle pair 0°, 240° for the first and second angle sensors, the controller discerns that the shaft is at an absolute angle of 960° at this point.

In addition, in this example it is to be noted that approximately ±20° of relative angle measurement error for the ring magnet is permissible without affecting the absolute angle the controller determines. This can be seen by using equation (4) above. If the system is designed so fewer rotations of the button magnet are required to achieve the absolute angle for the shaft 102, there will be less accuracy needed for the ring magnet's angle sensor.

Figure 7:
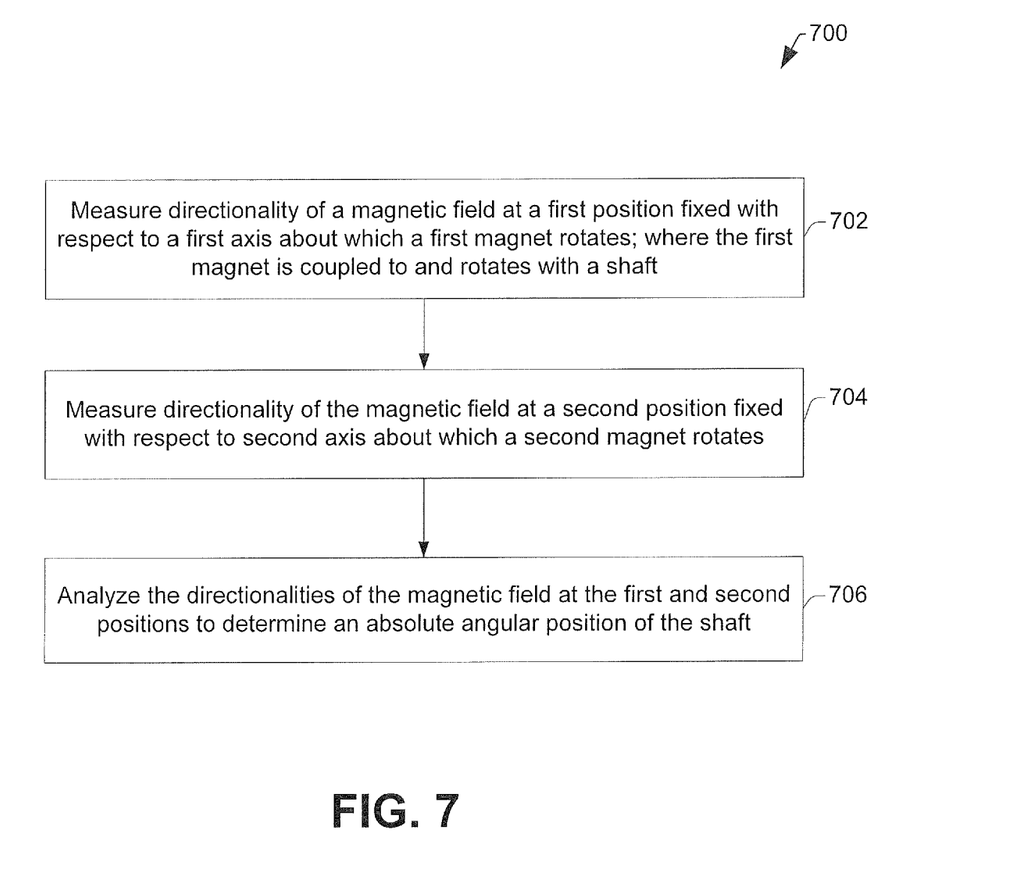
FIG. 7 is a flow diagram illustrating a method in accordance with some embodiments.

Referring to FIG. 7, one can see a method 700 in accordance with some embodiments. While the methods described herein are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated acts or events may be required to implement a methodology in accordance with the present invention.

Method 700 starts at 702 when the directionality of a magnetic field is measured at a first position. The first position is often fixed with respect to a first axis about which a first magnet rotates. For example, in FIG. 1's embodiment, the first position could correspond to that of the first angle sensor 134 and the first axis could correspond to first axis 110 about which the first magnet 118 rotates.

At 704, the method 700 measures the directionality of the magnetic field at a second position. The second position is often fixed with respect to a second axis about which a second magnet rotates. For example, in FIG. 1's embodiment, the second position could correspond to that of the second angle sensor 136 and the second axis could correspond to second axis 112 about which second magnet 126 rotates.

At 706, the method 700 analyzes the directionalities of the magnetic field at the first and second positions to determine an absolute angular position of the shaft. The first and second magnets are often arranged to cooperatively move so the magnetic field directionalities at the first and second positions vary according to a predetermined relationship, such that different magnetic field directionalities at the first and second positions correspond unique absolute angles of the rotating shaft.

Figure 8:
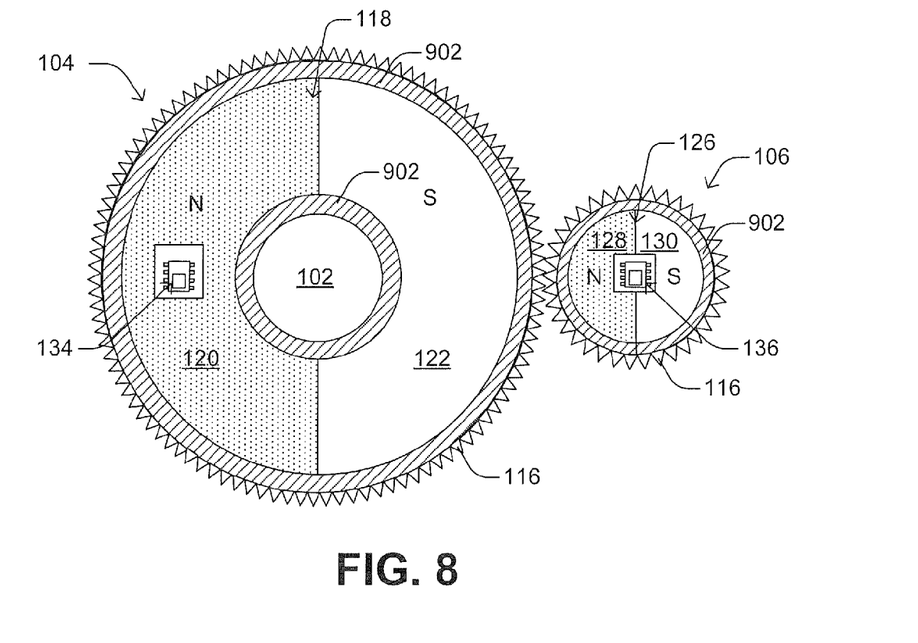
FIG. 8 is an embodiment illustrating one example of redundant angle sensors.

Although various embodiments have been described above, variations of these embodiments are also contemplated as falling within the scope of the present disclosure. For example, although the first and second magnets have been illustrated in previous figures as continuously extending from the shaft 102 to the outer radii of the first and second bodies (as was previously shown in FIG. 1), other arrangements are possible. FIG. 8 illustrates one such embodiment where a housing or manifold 902 is disposed between the shaft 102 and the ring magnet 118. The housing or manifold 902 can also be disposed between the outer radius of the ring magnet 118 and the surrounding teeth 116, as well as between the button magnet 126 and its surrounding teeth 116.

In some embodiments, the first and second magnets 118, 126 can be manufactured using an injection molding technique, in which a rubber or plastic material is impregnated with magnetizable material. In other embodiments, such as those using the housing or manifold 902, the magnets 118, 126 can be coupled to the shaft 102 in other manners (e.g., fasteners or adhesives).

Figure 9:
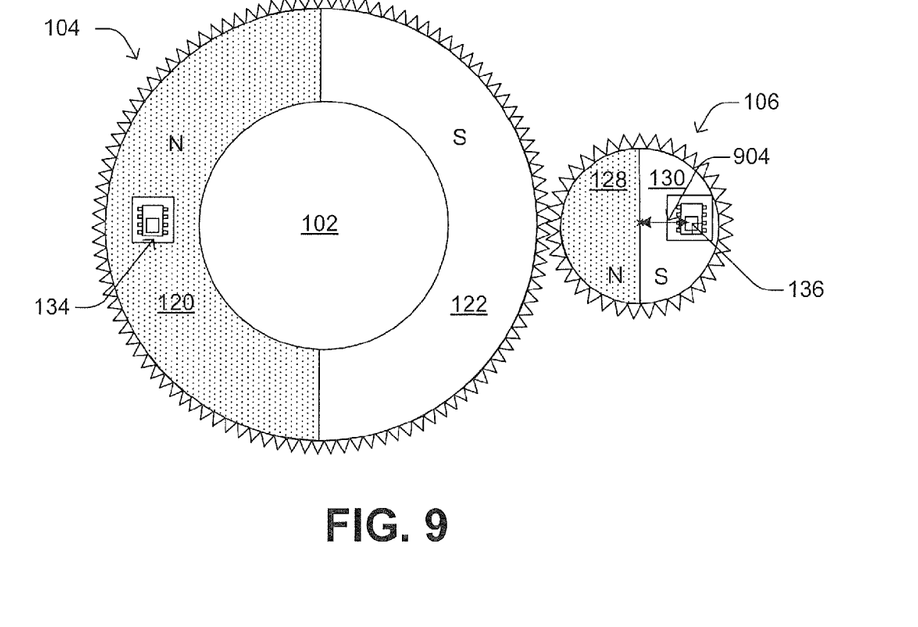
FIG. 9 is an embodiment illustrating one example where additional structures, other than magnets, are included in rotational bodies.

Although the second angle sensor 136 has been illustrated and described above as being at least substantially centered on the rotational axis of the second (button) magnet 126, in other embodiments (FIG. 9) the second angle sensor 136 could be spaced apart from the rotational axis of the second button magnet by distance 904.

Figure 10:
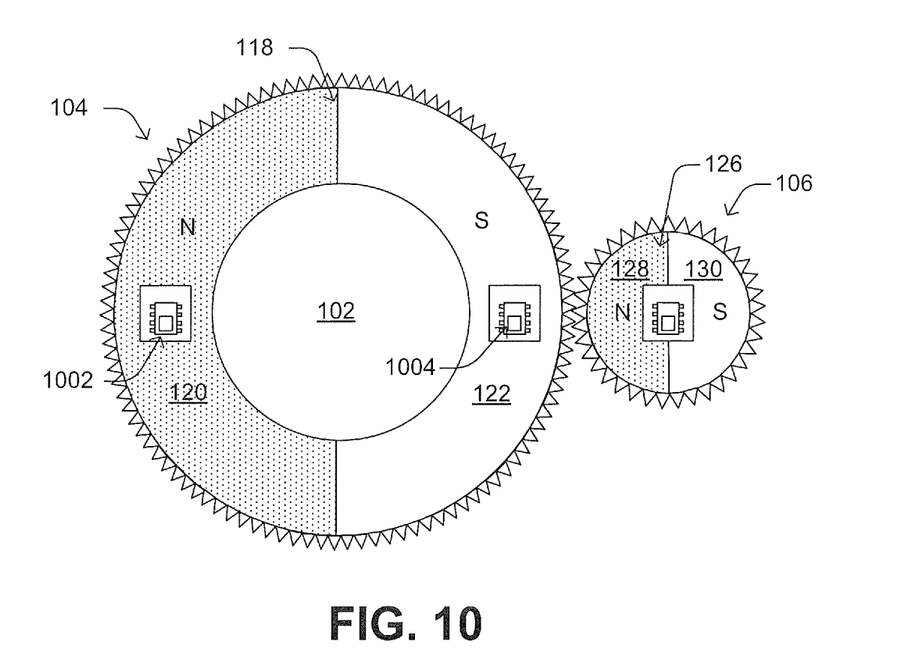
FIG. 10 is an embodiment illustrating one example that includes redundant angle sensors.

Further, although the previously illustrated embodiments show only one angle sensor over each magnet, additional (redundant) angle sensors can also be scattered in various ways angle sensing systems in accordance with this disclosure. Thus, FIG. 10 shows one example where two angle sensors 1002, 1004 are disposed over the first magnet 118. While these angle sensors 1002, 1004 are separated by 180° relative to one another, in some other embodiments N angle sensors could be equally spaced at N/360° relative to one another, where N is an integer number of redundant angle sensors. Further, N angle sensors could also be spaced at non-equal angular distances relative to one another.

Figure 14:
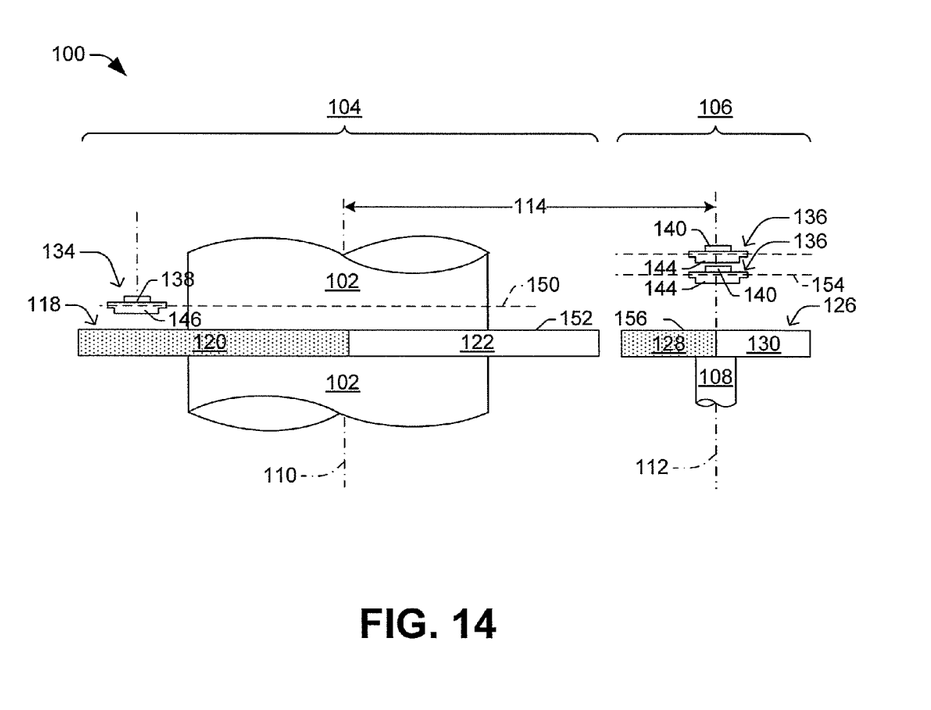
FIG. 14 is an embodiment illustrating an example with a redundant angle sensor.

If present, redundant angle sensors can often lie in a single plane (e.g., plane 150 in FIG. 2) over the first magnet 118. However, redundant angle sensors can also be "stacked" over one another over the second magnet 126 in these and other implementations, such as shown in FIG. 14 for example. Whatever the arrangement used, redundant angle sensors may help to facilitate reliable angular sensing for a long period of time.

Figure 11:
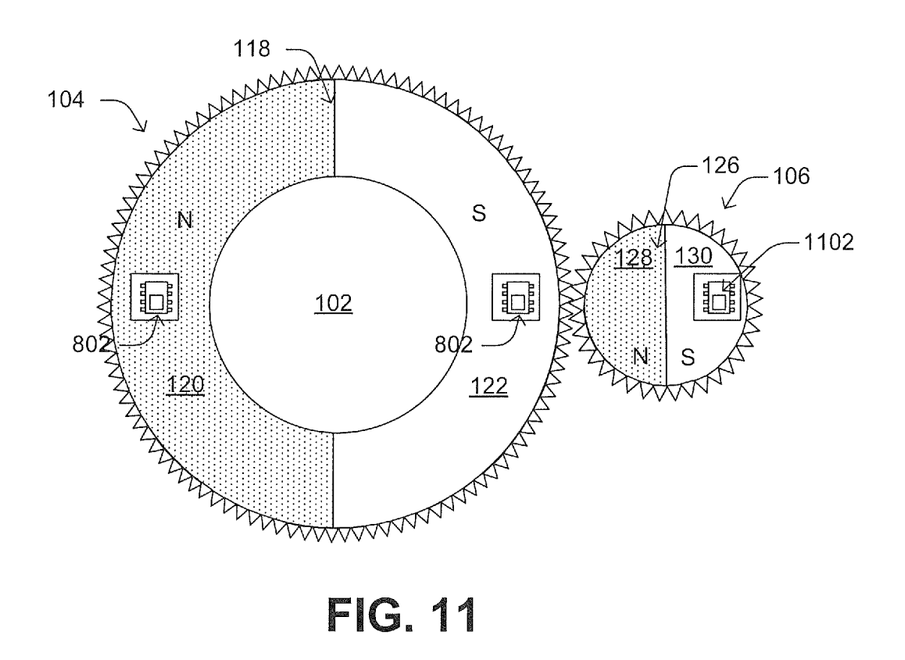
FIG. 11 is an embodiment illustrating one example that includes an off-center angle sensor over a button magnet.

FIG. 11 shows another embodiment where redundant sensors are disposed over the first (ring) magnet 118, and where an off-center angle sensor 1102 is disposed over the second (button) magnet 126.

Figure 12:
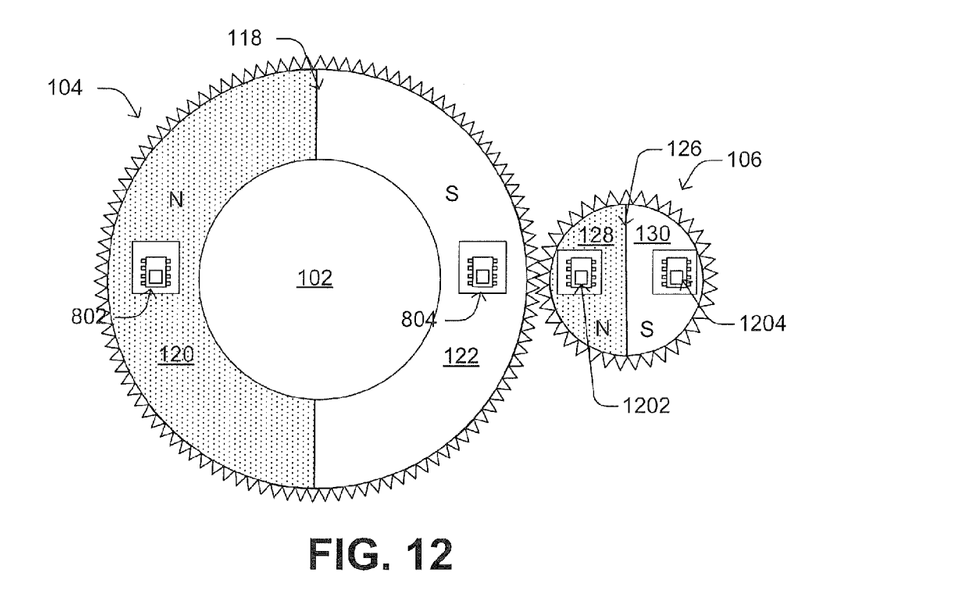
FIG. 12 is an embodiment illustrating one example that includes a pair of off-center angle sensor over a button magnet.

FIG. 12 shows another embodiment where a pair of off-center redundant angle sensors 1202, 1204 are disposed over the second (button) magnet 126.

Figure 13:
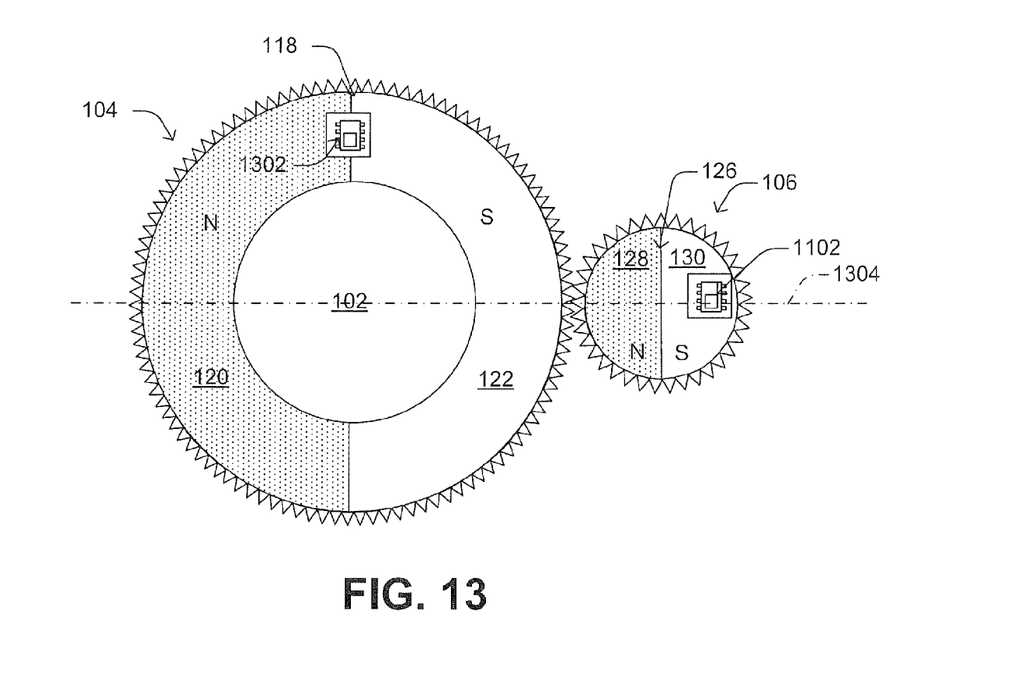
FIG. 13 is an embodiment illustrating one example where an angle sensor is offset at 90° relative to an x-axis that passes through the centers of first and second rotational bodies.

Note that although it may be simpler in some respects, it is not necessary to have magnets disposed in diametrically opposed positions. Therefore, FIG. 13 shows an example where an angle sensor 1302 over the first magnet 118 is positioned at a 90° angle relative to an x-axis 1304 passing through the centers of first and second bodies.

Further, although the illustrated embodiments have shown only two rotating bodies (e.g., first and second bodies 104, 106 in FIG. 1) In some unillustrated embodiments, more than two bodies will be used. For example, more complex gear systems can be used to facilitate desired rotational motion of magnets, where the gear systems include three, four, five, or many more bodies, each of which can have teeth arranged on its perimeter. Two or more angle sensors can be arranged with respect to these gear systems to enable accurate detection of an angular position of a rotating shaft.

As one skilled in the art will appreciate, different companies can refer to a component by different names. This document does not intend to distinguish between components that differ in name but not function herein. In this document the terms "including" and "comprising" are used in an open ended fashion, and thus should be interpreted to mean "including, but not limited to . . . " Also, the term "couple" (and variations thereof) is intended to mean either an indirect or direct connection. Thus, if a first element is coupled to a second element, that connection may be a direct connection, or may be an indirect connection via other elements and connections. Although various approximately numeric values are provided herein, these numeric values are merely examples should not be used to limit the scope of the disclosure.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. An angle measurement system for determining an angular position of a shaft, comprising:

first and second magnets adapted to cooperatively rotate over different angular distances according to a predetermined relationship, where the first magnet consists of a single pole-pair which is radially disposed about an entire circumference of the shaft and which rotates with the shaft;

first and second angle sensors located at different positions and adapted to measure magnetic field directionality due to the first and second magnets, where the first angle sensor includes a sensing element that is located over the first magnet and which is at least substantially centered between an inner radius of the first magnet and an outer radius of the first magnet and wherein the second angle sensor is located on a rotational axis of the second magnet;

at least one redundant angle sensor over the second magnet, where the at least one redundant angle sensor is stacked over the second angle sensor and lies at least substantially on the rotational axis of the second magnet; and a controller adapted to determine the angular position of the shaft based on the magnetic field directionality measured by the first angle sensor and the second angle sensor.

2. The angle measurement system of claim 1, where the shaft is adapted to rotate through an absolute angle of more than three-hundred and sixty degrees, and where the controller is adapted to determine the absolute angle of the shaft based on the magnetic field directionality measured by the first and second angle sensors, wherein the absolute angle of the shaft is the angular position of the shaft.

3. The angle measurement system of claim 1, where the first angle sensor is stationary with respect to a rotational axis of the first magnet.

4. The angle measurement system of claim 1, where the second angle sensor is stationary with respect to the rotational axis of the second magnet.

5. The angle measurement system of claim 4, where the second angle sensor includes a sensing element that is at least substantially centered on the rotational axis of the second magnet.

6. The angle measurement system of claim 1, where teeth are disposed radially outside of the first and second magnets, where the teeth are arranged to establish the predetermined relationship according to a gear ratio.

7. The angle measurement system of claim 1, where at least one of the first angle sensor or the second angle sensor, comprises:

a semiconductor chip that includes an arrangement of Giant-Magnetoresistive (GMR) resistors arranged to cooperatively measure the magnetic field directionality.

8. A system for determining an absolute angular position of a shaft, comprising:

a first magnet adapted to rotate with the shaft about a first rotational axis, the first magnet consisting of only a single pole pair which is disposed about an entire circumference of the shaft;

a second magnet adapted to rotate about a second rotational axis that is spaced apart from the first rotational axis, the second magnet consisting of only a single pole pair;

a first angle sensor adapted to measure a first relative angle of a magnetic field due to the first and second magnets at a first position, where the first position is over the first magnet and spaced apart from the first rotational axis, the first angle sensor being at least substantially centered between an inner radius and an outer radius of the first magnet;

a second angle sensor adapted to measure a second relative angle of the magnetic field on the second rotational axis;

at least one redundant angle sensor over the second magnet, where the at least one redundant angle sensor is stacked over the second angle sensor and lies at least substantially on the second rotational axis; and a controller adapted to analyze the measured first and second relative angles to determine the absolute angular position of the shaft.

9. The system of claim 8, where the at least one redundant angle sensor lies in a common plane with the first angle sensor relative to a surface of the first magnet.

* * * * *